US012530705B2

(12) United States Patent
Jain et al.

(10) Patent No.: US 12,530,705 B2
(45) Date of Patent: Jan. 20, 2026

(54) MERCHANT LOYALTY PLATFORM

(71) Applicant: Visa International Service Association, San Francisco, CA (US)

(72) Inventors: Ranveer Raj Jain, Dubai (AE); Jenny Varghese Abraham, Dubai (AE)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/438,501

(22) Filed: Feb. 11, 2024

(65) Prior Publication Data

US 2025/0259202 A1    Aug. 14, 2025

(51) Int. Cl.
*G06Q 30/02* (2023.01)
*G06Q 20/40* (2012.01)
*G06Q 30/0226* (2023.01)

(52) U.S. Cl.
CPC ....... *G06Q 30/0232* (2013.01); *G06Q 20/405* (2013.01); *G06Q 30/0233* (2013.01)

(58) Field of Classification Search
CPC ............. G06Q 30/0232; G06Q 20/405; G06Q 30/0233
See application file for complete search history.

(56) References Cited

U.S. PATENT DOCUMENTS

| | | | | |
|---|---|---|---|---|
| 2003/0158818 A1* | 8/2003 | George | ................ | G06Q 20/382 705/64 |
| 2011/0010238 A1* | 1/2011 | Postrel | ............... | G06Q 30/0207 705/14.1 |
| 2012/0253914 A1* | 10/2012 | Black | ................ | G06Q 30/02 705/14.28 |
| 2013/0238408 A1* | 9/2013 | Cooke | ................ | G06Q 30/0207 705/14.27 |
| 2014/0358655 A1 | 12/2014 | Wheeler | | |
| 2015/0088633 A1* | 3/2015 | Salmon | ................ | G06Q 20/227 705/14.33 |
| 2017/0132652 A1* | 5/2017 | Kedzlie | ................ | G06Q 30/02 |
| 2017/0132653 A1 | 5/2017 | Venugopalan et al. | | |

FOREIGN PATENT DOCUMENTS

WO    2017154014 A1    9/2017

OTHER PUBLICATIONS

"MasterCard and Cardlytics Partner to Deliver an Integrated Card-Linked Loyalty Program for Banks of All Sizes" (published on Jul. 6, 2022 at https://www.cardlytics.com/blog/mastercard-and-cardlytics-partner-to-deliver-an-integrated-card-linked-loyalty-program-for-banks-of-all-sizes) (Year: 2022).*

* cited by examiner

*Primary Examiner* — James M Detweiler
(74) *Attorney, Agent, or Firm* — K&L Gates LLP

(57) ABSTRACT

A method and system for leveraging an existing issuer user application, associated with a payment network, to create centralized merchant loyalty platform. The centralized merchant loyalty platform consolidates computing resources from different merchant systems to a centralized processing system. The centralized processing system creates a scalable computing platform that allows for loyalty programs associated with a plurality of different merchants to be seamlessly accessed through the existing issuer user application.

18 Claims, 9 Drawing Sheets

MERCHANT LOYALTY PLATFORM

TECHNICAL FIELD

Various aspects of the present disclosure relate to a centralized merchant loyalty platform. The centralized merchant loyalty platform consolidates computing resources from different merchant systems to a centralized processing system. The centralized processing system reduces individual overhead on computing resources for merchants and creates a scalable computing platform for loyalty programs. The centralized processing system supports the access of a plurality of different merchants through an existing issuer application associated with a payment network.

SUMMARY

In one aspect, the present disclosure provides a computer-implemented method, comprising: receiving, by a processing server, a transaction authorization request, wherein the transaction authorization request comprises transaction information associated with a transaction between a customer and a merchant, and wherein the transaction information comprises an original transaction amount, a merchant identifier associated with the merchant, and a consumer PAN (primary account number) associated with a consumer; querying, by the processing server, earned-rewards rules, set by the merchant with the merchant identifier, and redemption rules, set by the consumer with the consumer PAN; determining, by the processing server, the transaction qualifies to earn rewards based on the original transaction amount and the earned-rewards rules; calculating, by the processing server, a value associated with redeemed points to apply to the transaction based on the earned-rewards rules and the redemption rules; updating, by the processing server, an updated transaction amount for the transaction authorization request, wherein the updated transaction amount is the original transaction amount in the transaction authorization request is reduced by the value associated with the redeemed points; transmitting, by the processing server, the updated transaction amount for the transaction authorization request to an issuer system; receiving, by the processing server, an authorization response indicating that the updated transaction amount was approved for the transaction authorization request; updating, by the processing server, a loyalty points balance in a loyalty points database for the consumer based on the consumer PAN and the merchant identifier; and transmitting, by the processing server, the authorization response to the merchant indicating that the updated transaction amount was approved for the transaction authorization request.

In another aspect, the present disclosure provides a computer-implemented method, comprising: receiving, by a loyalty rewards server, transaction information associated with a transaction between a customer and a merchant, wherein the transaction information comprises a transaction amount, a merchant identifier associated with the merchant, and a consumer PAN associated with a consumer; querying, by the loyalty rewards sever, earned-rewards rules, set by the merchant, with the merchant identifier and redemption rules, set by the consumer, with the consumer PAN; determining, by the loyalty rewards server, the transaction qualifies to apply customer rewards to the transaction amount based the earned-rewards rules; calculating, by the loyalty rewards server, a value associated with redeemed points to apply to the transaction based on the earned-rewards rules and the redemption rules; transmitting, by the loyalty rewards server, the value associated with the redeemed points to a payment processing server, wherein the transaction amount in a transaction authorization request is reduced by the value associated with the redeemed points; receiving, by the loyalty rewards server, a message indicating that the transaction amount was approved for the transaction authorization request; and updating, by the loyalty rewards server, a loyalty points balance in a loyalty points database for the consumer based on the consumer PAN and the merchant identifier.

In yet another aspect, the present disclosure provides a system comprising: a memory; and one or more processors communicably coupled to the memory, wherein the one or more processors is configured to: receive a transaction authorization request, wherein the transaction authorization request comprises transaction information associated with a transaction between a customer and a merchant, and wherein the transaction information comprises an original transaction amount, a merchant identifier associated with the merchant, and a consumer PAN associated with a consumer; query earned-rewards rules, set by the merchant, with the merchant identifier and redemption rules, set by the consumer, with the consumer PAN; determine the transaction qualifies to apply customer rewards to the original transaction amount based the earned-rewards rules and the redemption rules; calculate a value associated with redeemed points to apply to the transaction based on the earned-rewards rules and the redemption rules; update an updated transaction amount for the transaction authorization request, wherein the updated transaction amount is the original transaction amount in the transaction authorization request is reduced by the value associated with the redeemed points; transmit the updated transaction amount for the transaction authorization request to an issuer system; receive an authorization response indicating that the updated transaction amount was approved for the transaction authorization request; update a loyalty points balance in a loyalty points database for the consumer based on the consumer PAN and the merchant identifier; and transmit the authorization response to the merchant indicating that the updated transaction amount was approved for the transaction authorization request.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
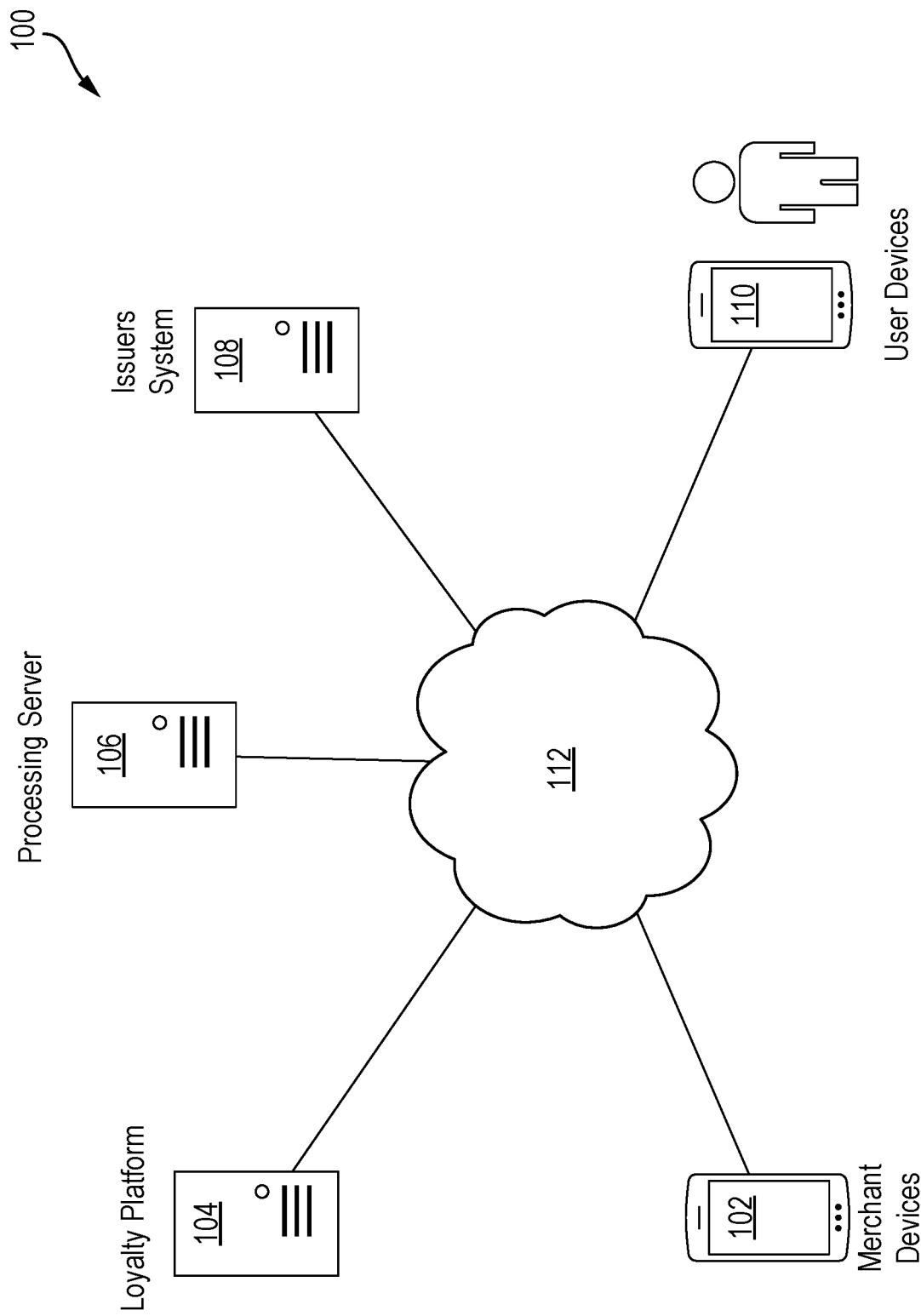

The systems and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 shows a network architecture diagram for a centralized merchant loyalty platform, according to at least one aspect of the present disclosure.

Figure 2:
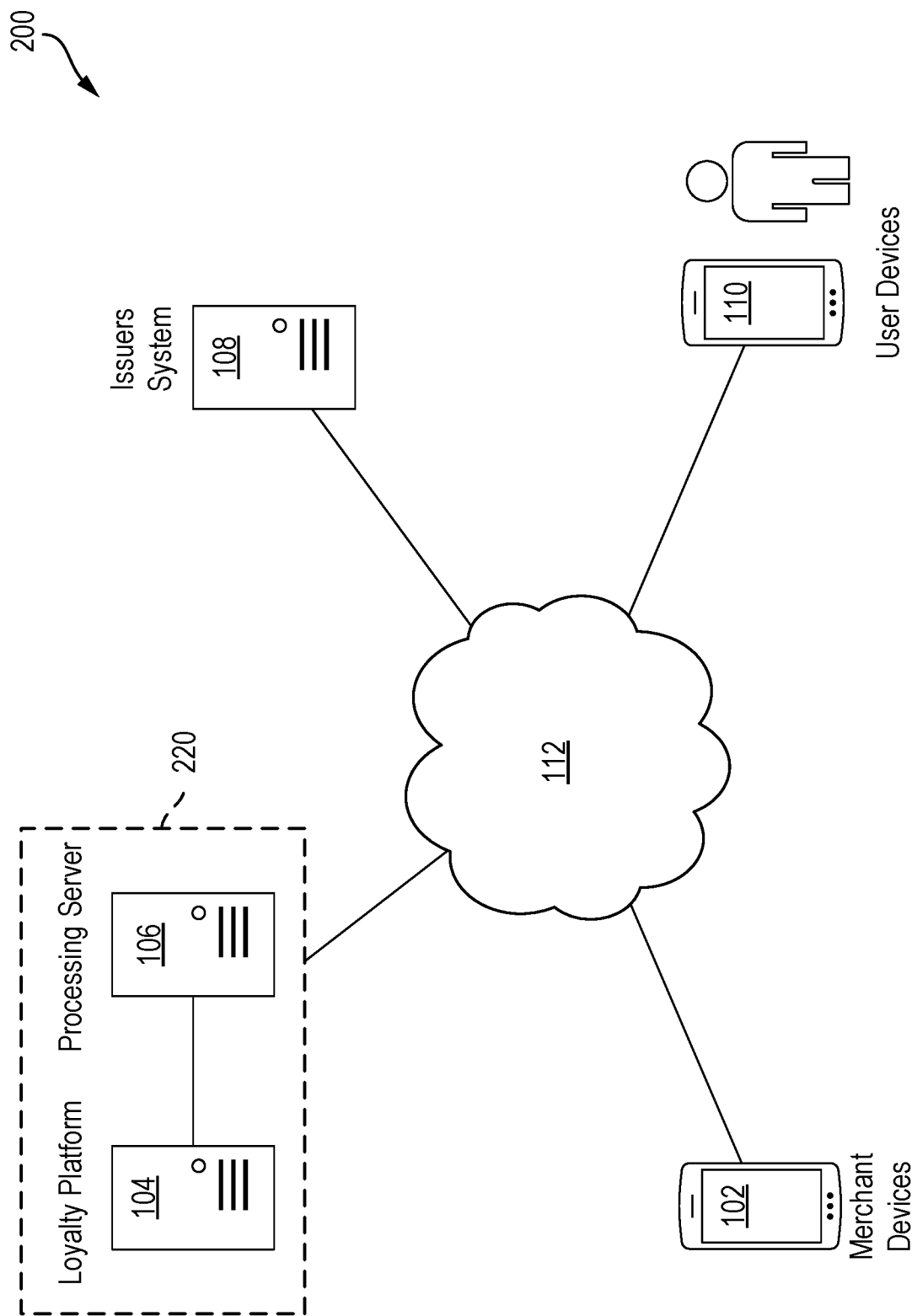

FIG. 2 shows a network architecture diagram for a centralized merchant loyalty platform, where the payment processing server and the loyalty program server are part of the payment network, according to at least one aspect of the present disclosure.

Figure 3:
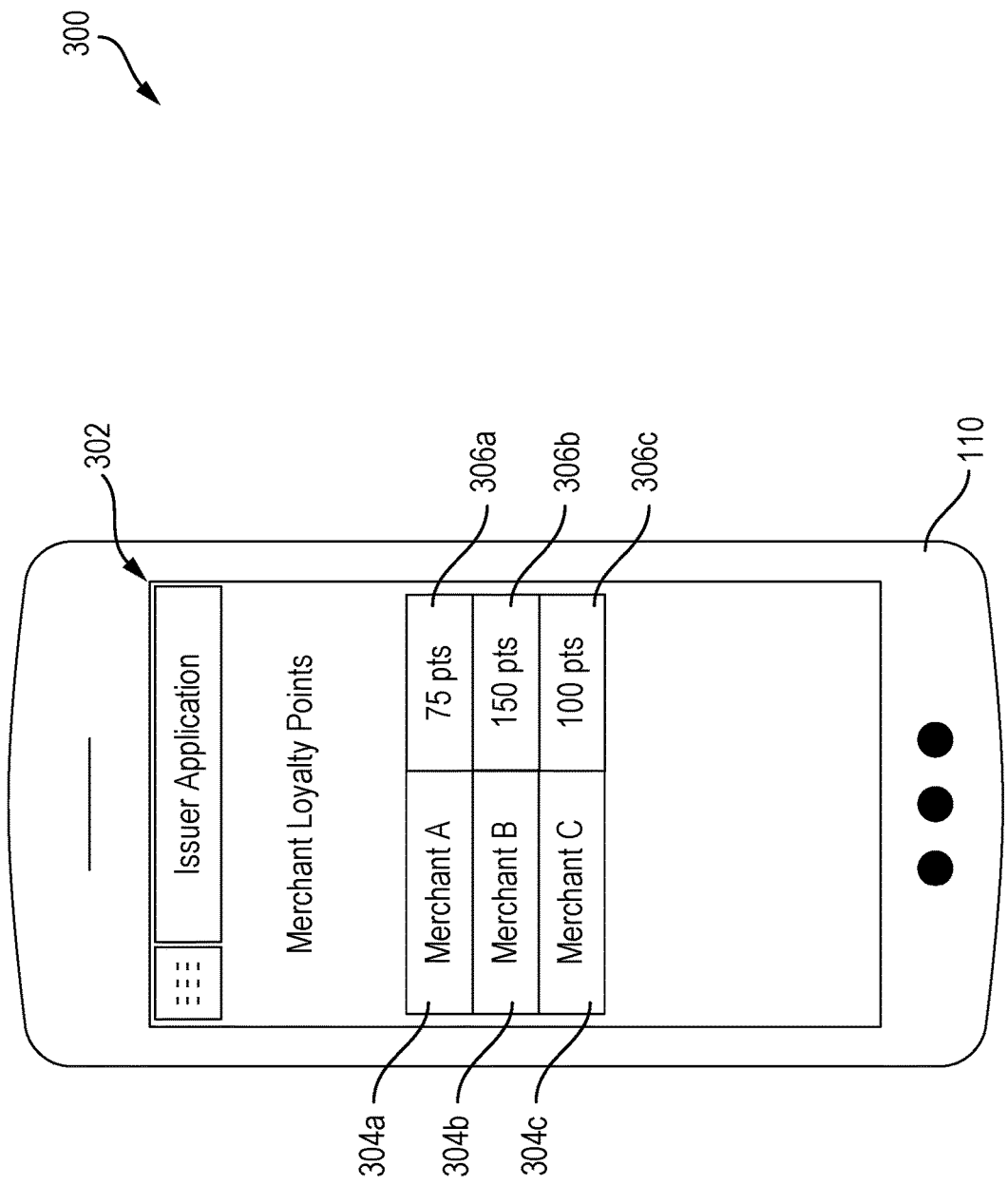

FIG. 3 shows an exemplary application interface displaying merchant loyalty points 300 in an issuer application, according to at least one aspect of the present disclosure.

Figure 4:
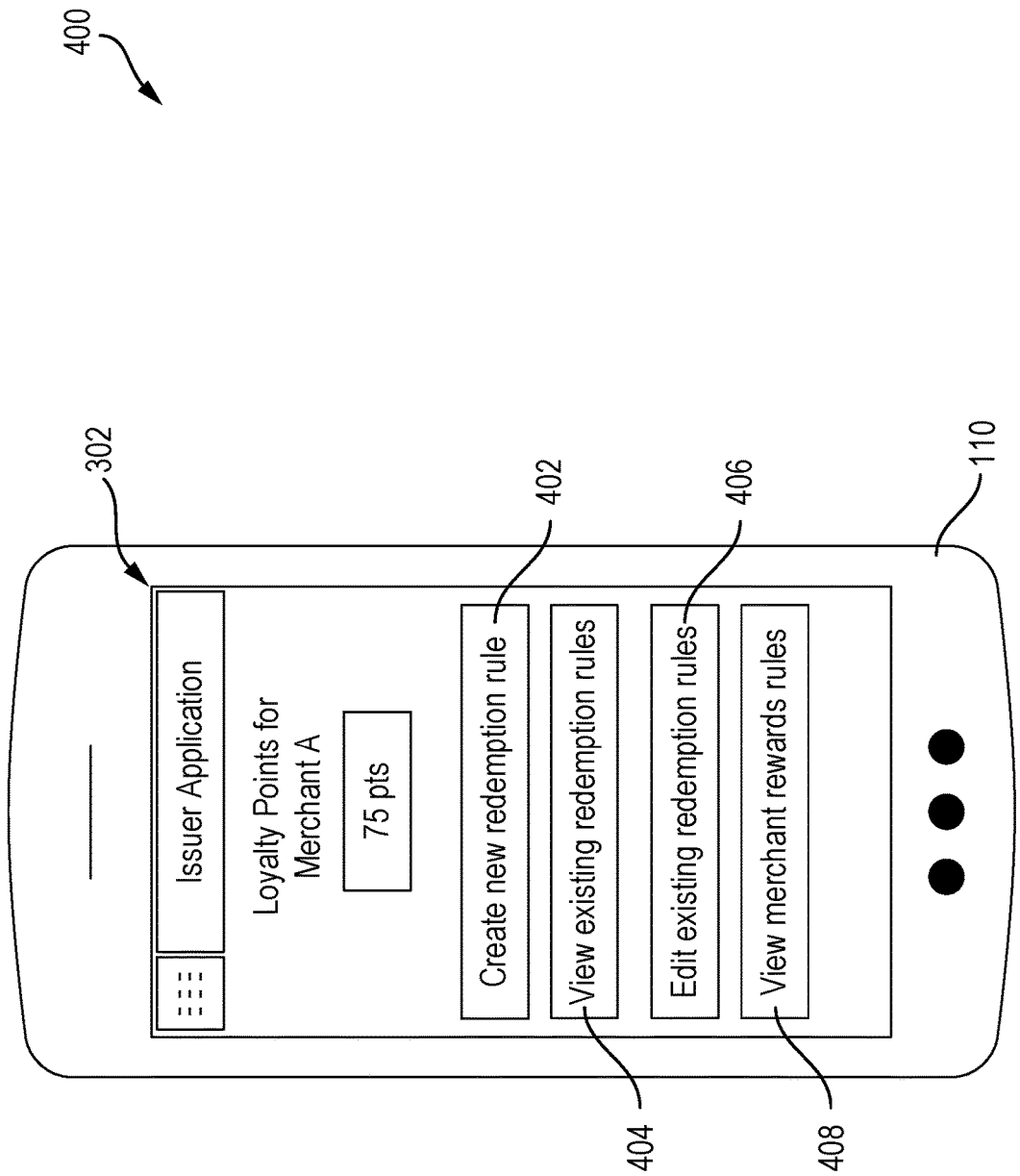

FIG. 4 shows an exemplary application interface displaying merchant specific information 400 in an issuer application, according to at least one aspect of the present disclosure.

Figure 5:
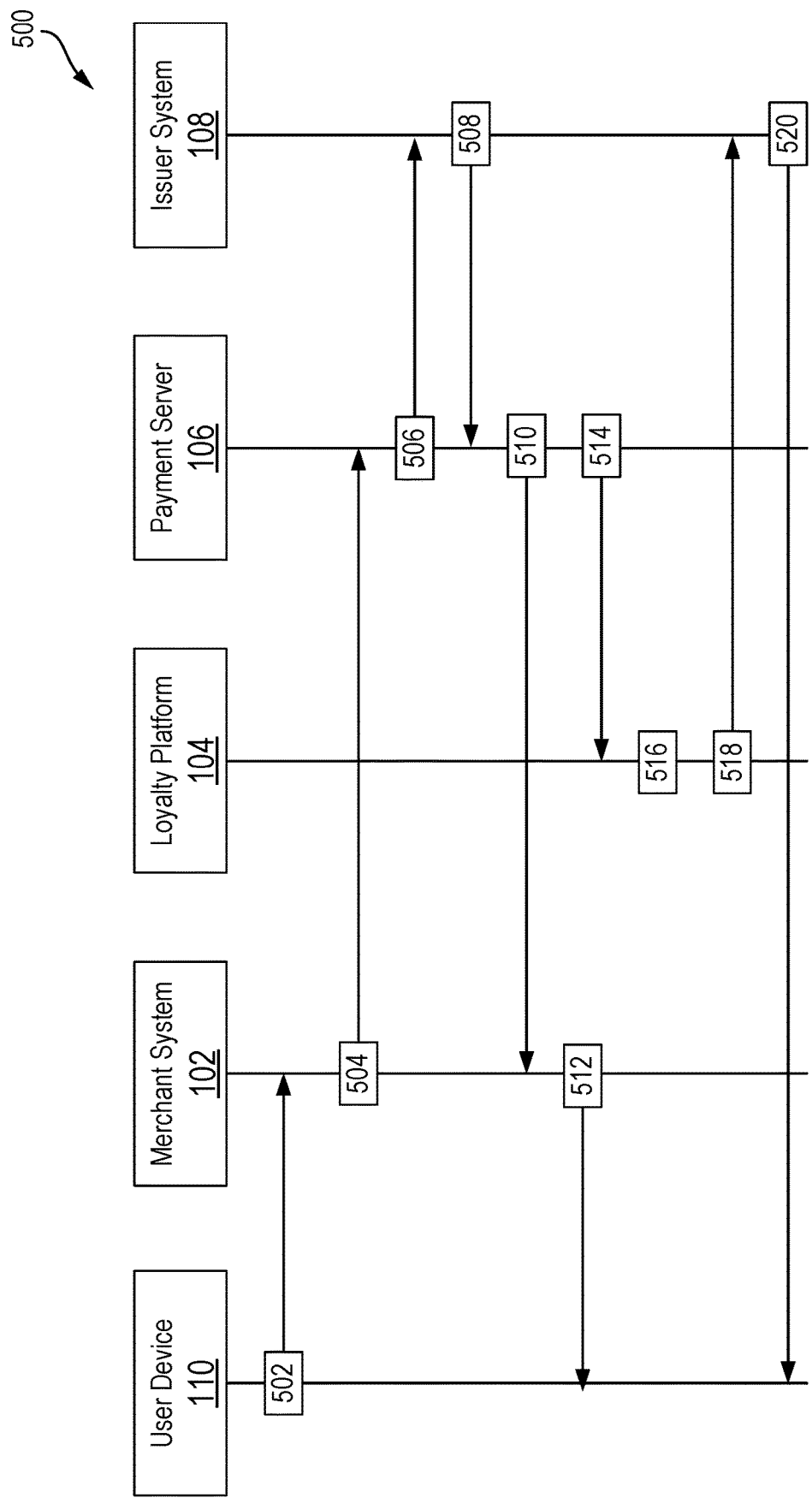

FIG. 5 shows a logic flow diagram for earning loyalty points for a merchant on a centralized merchant loyalty platform, according to at least one aspect of the present disclosure.

Figure 6:
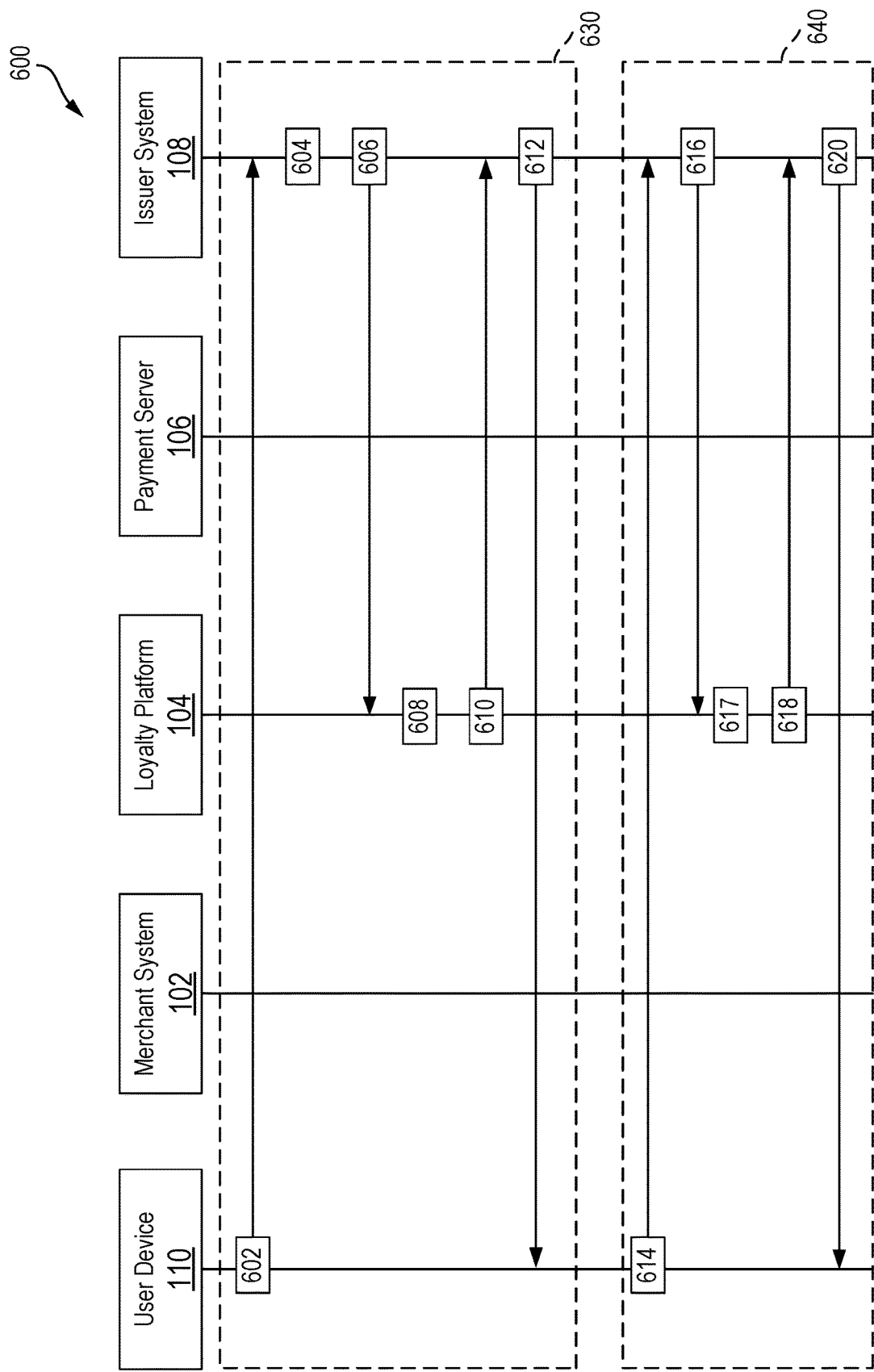

FIG. 6 shows a logic flow diagram for configuring redemption rules by a consumer on a centralized merchant loyalty platform, according to at least one aspect of the present disclosure.

Figure 7:
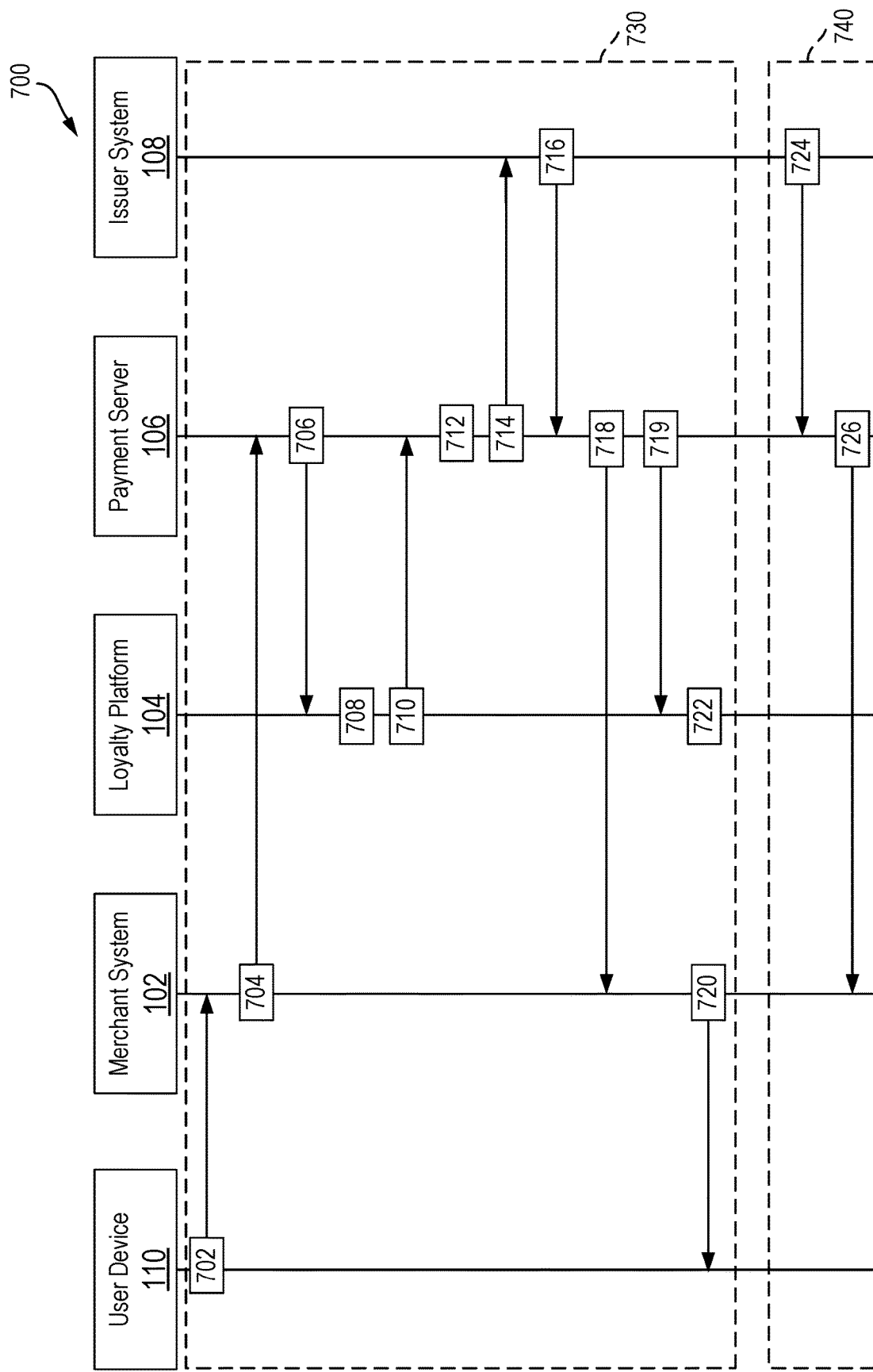

FIG. 7 shows a logic flow diagram for redeeming loyalty points in a centralized merchant loyalty platform, according to at least one aspect of the present disclosure.

Figure 8:
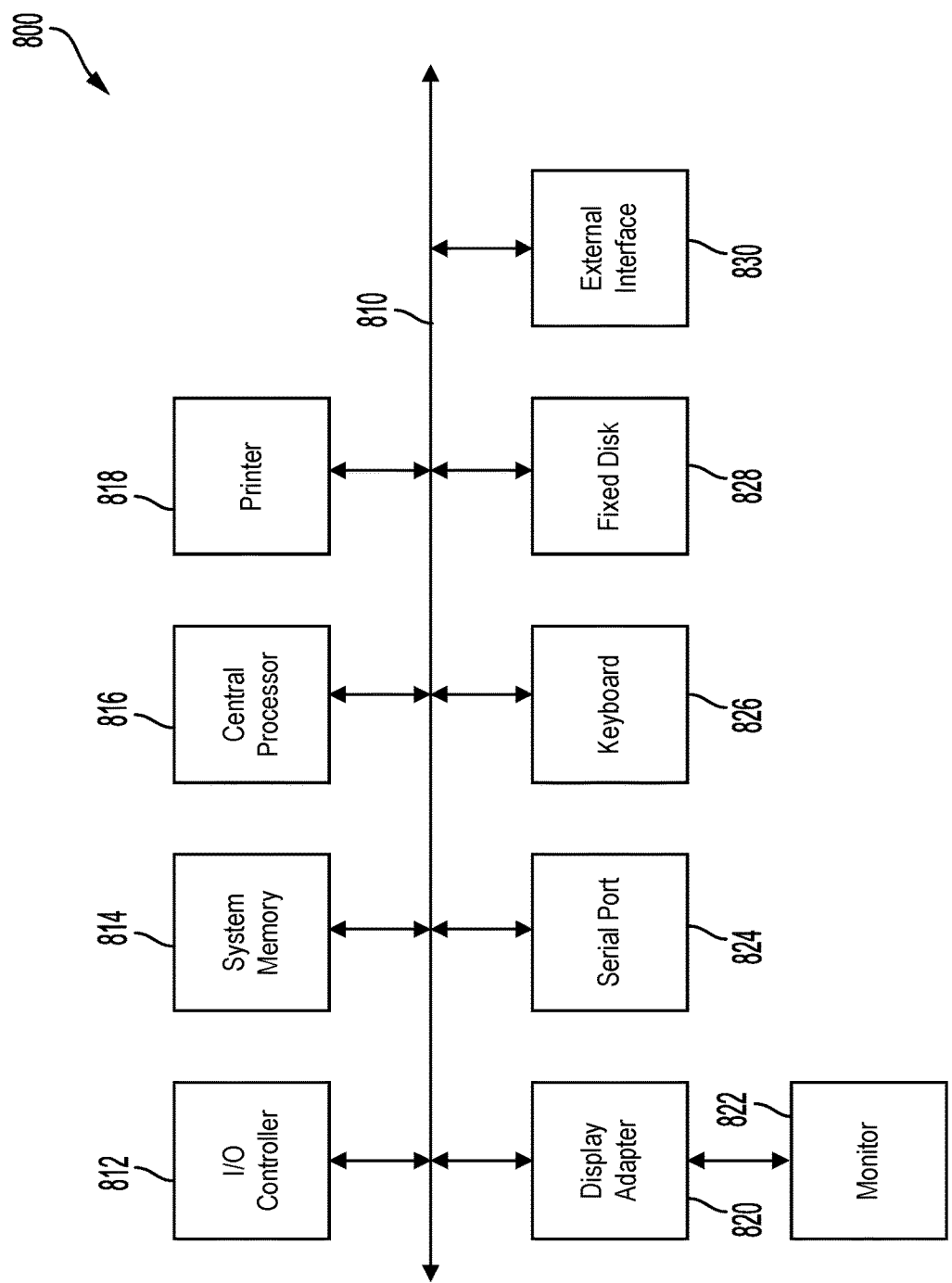

FIG. 8 is a block diagram of a computer apparatus with data processing subsystems or components, according to at least one aspect of the present disclosure.

Figure 9:
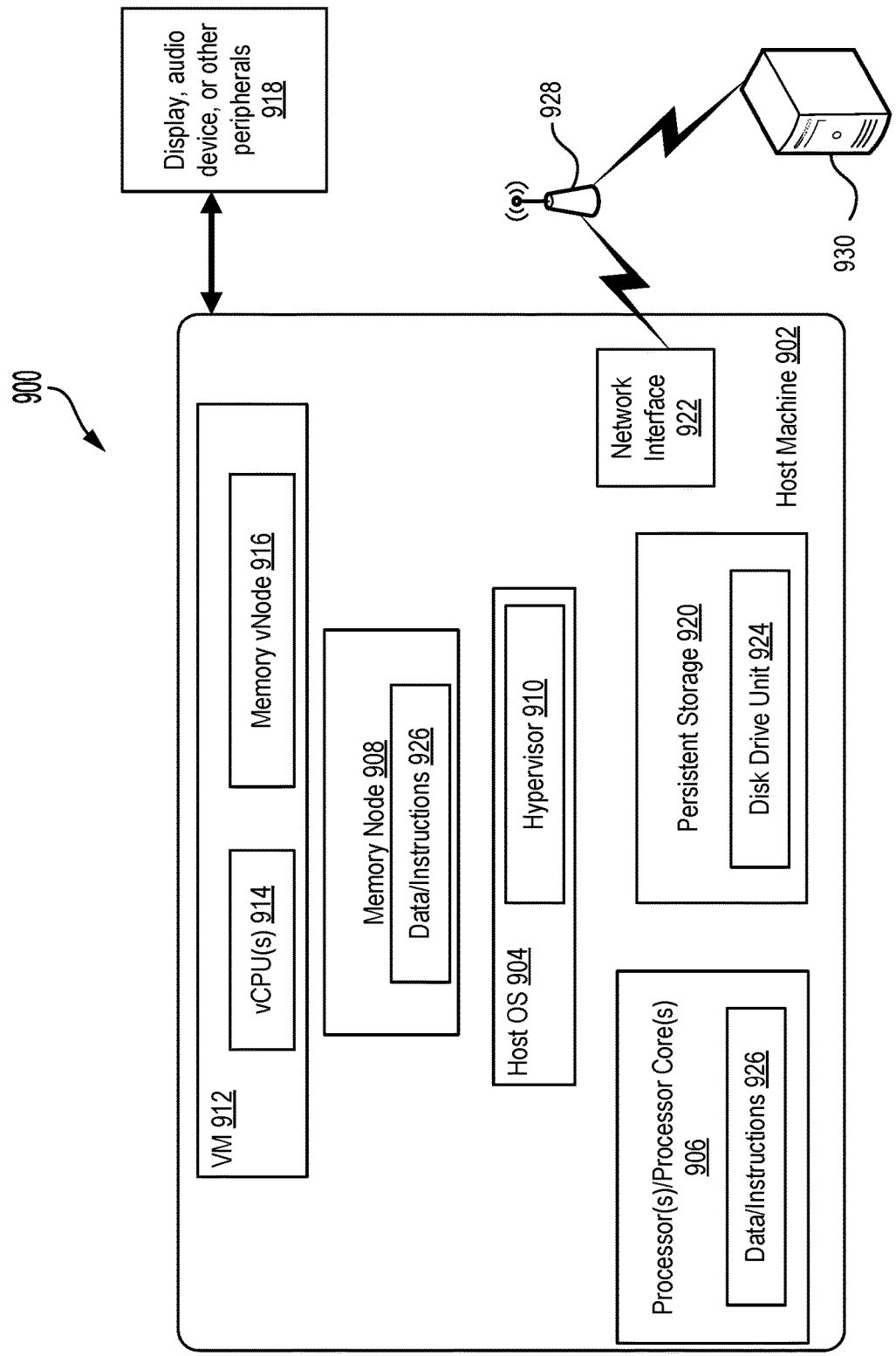

FIG. 9 is a diagrammatic representation of an example system that includes a host machine within which a set of instructions to perform any one or more of the methodologies discussed herein may be executed, according to at least one aspect of the present disclosure.

DESCRIPTION

Before discussing specific embodiments, aspects, or examples, some descriptions of terms used herein are provided below.

As used herein, the term "account identifier" may refer to one or more types of identifiers associated with an account (e.g., a unique identifier of an account, an account number, a personal account number (PAN), a card number, a payment card number, a token, and/or the like) of a user. In some non-limiting embodiments or aspects, an issuer may provide an account identifier (e.g., a PAN, a token, a globally unique identifier (GUID), a universally unique identifier (UUID), and/or the like) to a user that uniquely identifies one or more accounts associated with that user. In some non-limiting embodiments or aspects, an account identifier may be embodied on a payment device (e.g., a portable financial instrument, a payment card, a credit card, a debit card, and/or the like) and/or may be electronic information communicated to the user that the user may use for electronic payment transactions. In some non-limiting embodiments or aspects, an account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten by the user, stolen from the user, and/or the like, a supplemental account identifier may be provided to the user. In some non-limiting embodiments or aspects, an account identifier may be directly or indirectly associated with an issuer such that an account identifier may be a token that maps to a PAN or other type of identifier. Account identifiers may be alphanumeric, any combination of characters and/or symbols, and/or the like.

An "acquirer" may refer to an entity licensed by the transaction service provider and/or approved by the transaction service provider to originate transactions (e.g., payment transactions) using a portable financial device associated with the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

The term "acquirer" typically is a business entity (e.g., a commercial bank) that has a business relationship with a particular merchant or other entity. Some entities can perform both issuer and acquirer functions. Some embodiments or aspects may encompass such single entity issuer-acquirers. An acquirer may operate an acquirer computer, which can also be generically referred to as a "transport computer".

As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitator, and/or the like. In some non-limiting embodiments or aspects, an acquirer may be a financial institution, such as a bank.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction. A "wallet application" may include a software module with similar functionality to a payment application that has multiple accounts provisioned or enrolled such that they are usable through the wallet application. Further, an "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

"Authentication" is a process by which the credential of an endpoint (including but not limited to applications, people, devices, process, and systems) can be verified to ensure that the endpoint is who they are declared to be.

An "authorization platform" (e.g., an "issuer") may be a system that can authorize a transaction.

An "authorization request message" may be an electronic message that is sent to a payment processing network and/or an issuer of a payment account to request authorization for a payment transaction. An authorization request message according to some embodiments or aspects may comply with International Organization for Standardization (ISO) 8583, which is a standard for systems that exchange electronic transaction information associated with a payment made by a consumer using a payment device or a payment account. An ISO 8583 message includes a message type indicator, one or more bitmaps indicating which data elements are present in the message, and data elements of the message. The authorization request message may include an issuer account identifier that may be associated with a payment device or payment account. An authorization request message may be generated by an acceptance device or a server and may be sent to an issuing financial institution directly or through a payment network. In some embodiments or aspects of the present disclosure, an authorization request message may include a payment token, an expiration date, a token presentment mode, a token requestor identifier, a token cryptogram, a token assurance level, and data used to generate the token assurance level. The payment token may include a payment token issuer identifier that may be a substitute for a real issuer identifier for an issuer. For example, the real issuer identifier may be part of a bank identification number (BIN) range associated with the issuer. An authorization request message may also comprise additional data elements corresponding to "identification information" including, for example, a service code, a CVV or CVC (card verification value or code), a dCVV or dCVC (dynamic card verification value or code), token cryptogram, an expiration date, etc. An authorization request message may also comprise "transaction information," such as any information associated with a current transaction (e.g., the transaction amount, merchant identifier, merchant location, etc.) as well as any other information that may be utilized in determining whether to identify and/or authorize a payment transaction.

An "authorization response message" may be an electronic message reply to an authorization request message generated by an issuing financial institution (e.g., issuer) or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may include an authorization code, which may be a code that an account issuing bank returns in response to an authorization request message in an electronic message (either directly or through the payment processing network) to the merchant's access device (e.g., point-of-sale (POS) terminal) that indicates approval of the transaction. The code may serve as proof of authorization. As noted above, in some embodiments or aspects, a payment processing network may generate and/or forward the authorization response message to the merchant.

As used herein, an "authorization system" may refer to a system, a device, or components of a device that may utilize information to determine the probability or likelihood that a transaction is fraudulent. Although the term "merchant processor" may be referred to separately from an "authorization system" in portions of this disclosure, in some embodiments or aspects they may comprise one and the same system or systems that may perform substantially the same functionality, but in relation to different components of the system (e.g., providing information to a merchant or an issuer). In some embodiments or aspects, authorization systems may quantify the probabilities or likelihood of a fraudulent transaction by generating a "risk score." In some embodiments or aspects, the authorization system may approve or reject a transaction. An exemplary embodiment or aspect of an authorization system is provided in U.S. Pat. No. 7,809,650 to Bruesewitz et al. entitled "Method and System for Providing Risk Information in Connection with Transaction Processing," which is hereby incorporated by reference in its entirety. It should be understood that embodiments or aspects are not so limited.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

A "Bank Identification Number (BIN)" may be assigned by a payment network to an issuer of a payment account. BINs may be consistent with industry account and issuer identification specifications (e.g., ISO 7812) such that the payment processing network assigning the BIN may be identified based on the BIN and associated account ranges. Similarly, the issuer of the payment account may be identified based on the BIN assigned to the issuer by the payment processing network.

As used herein, the terms "client" and "client device" may refer to one or more client-side devices or systems (e.g., remote from a transaction service provider) used to initiate or facilitate a transaction (e.g., a payment transaction). Moreover, a "client" may also refer to an entity (e.g., a merchant, an acquirer, and/or the like) that owns, utilizes, and/or operates a client device for initiating transactions (e.g., for initiating transactions with a transaction service provider).

The terms "client device" and "user device" refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a POS system, and/or any other device, system, and/or software application configured to communicate with a remote device or system.

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data. It will be appreciated that numerous other arrangements are possible.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

A "consumer" may include an individual or a user that may be associated with one or more personal accounts and/or consumer devices. The consumer may also be referred to as a cardholder, account holder, or user.

Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

An "end-user" may include any application, consumer, process, or system that is configured to interact with a requestor for tokenization/de-tokenization/token management services. For example, an end-user may include a consumer, a merchant, a mobile device, or any other suitable entity that may be associated with a requestor in the network token system.

An "interface" may include any software module configured to process communications. For example, an interface may be configured to receive, process, and respond to a particular entity in a particular communication format. Further, a computer, device, and/or system may include any number of interfaces depending on the functionality and capabilities of the computer, device, and/or system. In some embodiments or aspects, an interface may include an API or other communication format or protocol that may be provided to third parties or to a particular entity to allow for communication with a device. Additionally, an interface may be designed based on functionality, a designated entity configured to communicate with, or any other variable. For example, an interface may be configured to allow for a system to field a particular request or may be configured to allow a particular entity to communicate with the system.

An "issuer" can include a payment account issuer. The payment account (which may be associated with one or more payment devices) may refer to any suitable payment account (e.g., credit card account, a checking account, a savings account, a merchant account assigned to a consumer, or a prepaid account), an employment account, an identification account, an enrollment account (e.g., a student account), etc.

The terms "issuer institution," "portable financial device issuer," "issuer," or "issuer bank" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions), such as initiating credit and/or debit payments. For example, an issuer may provide an account identifier, such as a PAN, to a user that uniquely identifies one or more accounts associated with the user. The account identifier may be used by the user to conduct a payment transaction. The account identifier may be embodied on a portable financial device, such as a physical financial instrument, e.g., a payment card, and/or may be electronic and used for electronic payments. In some non-limiting embodiments or aspects, an issuer may be associated with a BIN that uniquely identifies the issuer. As used herein "issuer system" or "issuer institution system" may refer to one or more systems operated by or operated on behalf of an issuer. For example, an issuer system may refer to a server executing one or more software applications associated with the issuer. In some non-limiting embodiments or aspects, an issuer system may include one or more servers (e.g., one or more authorization servers) for authorizing a payment transaction.

As used herein, the term "merchant" may refer to one or more individuals or entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein "merchant system" may refer to one or more computer systems operated by or on behalf of a merchant, such as a server computer executing one or more software applications.

A "merchant application" may include any application associated with a relying party to a transaction. For example, a merchant mobile application may be associated with a particular merchant or may be associated with a number of different merchants. In some embodiments or aspects, the merchant mobile application may store information identifying a particular merchant server computer that is configured to provide a sales environment in which the merchant server computer is capable of processing remote transactions initiated by the merchant application. Further, the merchant mobile application may also include a general purpose browser or other software designed to interact with one or more merchant server computers. In some cases, the merchant mobile application may be installed in the general purpose memory of a user device and thus, may be susceptible to malicious attacks.

A "merchant category code" (MCC) may refer to a numerical indication of a type of business classified according to the goods or services the business provides, such as "supermarket," "quick service restaurant," or "fuel dispenser." Different rates may be charged by a payment processing network depending on the MCC generating the transaction. A user may generate transactions having different associated MCC values and may wish to generate different routing priority lists for each MCC. A merchant verification value (MVV) may be a customizable value, such as a numerical indication of a region or a particular store.

As used herein, a "mobile device" may comprise any electronic device that may be transported and operated by a user, which may also provide remote communication capabilities to a network. Examples of remote communication capabilities include using a mobile phone (wireless) network, wireless data network (e.g., 3G, 4G, or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g., when a device has remote access to a network by tethering to another device—e.g., using the other device as a modem—both devices taken together may be considered a single mobile device). A mobile device may also comprise a verification token in the form of, for instance, a secured hardware or software component within the mobile device and/or one or more external components that may be coupled to the mobile device. A detailed description of an exemplary mobile device is provided below.

An "original" transaction may include any transaction including an authorization provided by an issuer or an authorization provided on-behalf-of an issuer.

As used herein, a "payment account" (which may be associated with one or more payment devices) may refer to any suitable payment account including a credit card account, a checking account, or a prepaid account.

A "payment device" may refer to any device that may be used to conduct a financial transaction, such as to provide payment information to a merchant. A payment device may be in any suitable form. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. For example, suitable payment devices can be hand-held and compact so that they can fit into a consumer's wallet and/or pocket (e.g., pocket-sized). They may include smart cards, debit devices (e.g., a debit card), credit devices (e.g., a credit card), stored value devices (e.g., a stored value card or "prepaid" card), magnetic stripe cards, keychain devices (such as the Speedpass™ commercially available from Exxon-Mobil Corp.), etc. Other examples of payment devices include cellular or wireless telephones (e.g., a smartphone), PDAs, portable computer (e.g., tablet or laptop computer), pagers, payment cards, security cards, access cards, smart media, transponders, 2D barcodes, an electronic or digital wallet, and the like. If the payment device is in the form of a debit, credit, or smartcard, the payment device may also optionally have features such as magnetic stripes. Such devices can operate in either a contact or contactless mode. In some non-limiting embodiments or aspects, a payment device may include an electronic payment device, such as a smartcard, a chip card, integrated circuit card, and/or the like. An electronic payment device may include an embedded integrated circuit and the embedded integrated circuit may include a data storage medium (e.g., volatile and/or non-volatile memory) to store information associated with the payment device, such as an account identifier, a name of the account holder, and/or the like. The payment device may interface with an access device such as a point-of-sale device to initiate the transaction. In some embodiments or aspects, a mobile device can function as a payment device (e.g., a mobile device can store and be able to transmit payment credentials for a transaction). Further, a payment device may be associated with a value such as a monetary value, a discount, or store credit, and a payment device may be associated with an entity such as a bank, a merchant, a payment processing network, or a person. A payment device may be used to make a payment transaction.

A "payment network" may refer to an electronic payment system used to accept, transmit, or process transactions made by payment devices for money, goods, or services. The payment network may transfer information and funds among issuers, acquirers, merchants, and payment device users. One illustrative non-limiting example of a payment network is VisaNet, which is operated by Visa, Inc.

A "payment processing network" may refer to a system that receives accumulated transaction information from the gateway processing service, typically at a fixed time each day, and performs a settlement process. Settlement may involve posting the transactions to the accounts associated with the payment devices used for the transactions and calculating the net debit or credit position of each user of the payment devices. An exemplary payment processing network is Interlink®.

A "primary account number (PAN)" may be a variable length, (e.g., 13 to 19-digit) industry standard-compliant account number that is generated within account ranges associated with a BIN by an issuer.

A "processing network" may include an electronic system used to accept, transmit, or process transactions made by devices. The processing network may transfer information among transacting parties (e.g., issuers, acquirers, merchants, device users, etc.).

A payment processing network that is "providing degraded service" satisfies one or more system degradation criteria. System degradation criteria include any condition resulting in delayed processing of an authorization request message by a payment processing network. System degradation criteria may also include failure of a payment processing network to process an authorization request message.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers (e.g., servers, POS devices, or other computerized devices), directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer, or an issuer. In one example, the server computer may be a database server coupled to a web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments or aspects, the server computer may provide and/or support payment network cloud service.

As used herein, the term "system" may refer to one or more computing devices or combinations of computing devices (e.g., processors, servers, client devices, software applications, components of such, and/or the like).

A "transaction amount" may be the price assessed to the consumer for the transaction. The transaction amount condition may be a threshold value (e.g., all transactions for an amount exceeding $100) or a range (e.g., all transactions in the range of $25-$50). For example, a user may wish to use a first routing priority list for a transaction for an amount in the range of $0.01-$100 and a second routing priority list for a transaction for an amount exceeding $100.

The term "transaction data" may include any data associated with one or more transactions. In some embodiments or aspects, the transaction data may merely include an account identifier (e.g., a PAN) or payment token. Alternatively, in other embodiments or aspects, the transaction data may include any information generated, stored, or associated with a merchant, consumer, account, or any other related information to a transaction. For example, transaction data may include data in an authorization request message that is generated in response to a payment transaction being initiated by a consumer with a merchant. Alternatively, transaction data may include information associated with one or more transactions that have been previously processed and the transaction information has been stored on a merchant database or other merchant computer. The transaction data may include an account identifier associated with the payment instrument used to initiate the transaction, consumer personal information, products or services purchased, or any other information that may be relevant or suitable for transaction processing. Additionally, the transaction information may include a payment token or other tokenized or masked account identifier substitute that may be used to complete a transaction and protect the underlying account information of the consumer.

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein "transaction service provider system" may refer to one or more systems operated by or operated on behalf of a transaction service provider, such as a transaction service provider system executing one or more software applications associated with the transaction service provider. In some non-limiting embodiments or aspects, a transaction processing system may include one or more server computers with one or more processors and, in some non-limiting embodiments or aspects, may be operated by or on behalf of a transaction service provider.

A "user" may include an individual. In some embodiments or aspects, a user may be associated with one or more personal accounts and/or mobile devices. The user may also be referred to as a cardholder, account holder, or consumer.

A "user device" is an electronic device that may be transported and/or operated by a user. A user device may provide remote communication capabilities to a network. The user device may be configured to transmit and receive data or communications to and from other devices. In some embodiments or aspects, the user device may be portable. Examples of user devices may include mobile phones (e.g., smart phones, cellular phones, etc.), PDAs, portable media players, wearable electronic devices (e.g., smart watches, fitness bands, ankle bracelets, rings, earrings, etc.), electronic reader devices, and portable computing devices (e.g., laptops, netbooks, ultrabooks, etc.). Examples of user devices may also include automobiles with remote communication capabilities.

"User information" may include any information that is associated with a user. For example, the user information may include a device identifier of a device that the user owns or operates and/or account credentials of an account that the user holds. A device identifier may include a unique identifier assigned to a user device that can later be used to verify the user device. In some embodiments or aspects, the device identifier may include a device fingerprint. The device fingerprint may an aggregation of device attributes. The device fingerprint may be generated by a software development kit (SDK) provided on the user device using, for example, a unique identifier assigned by the operating system, an International Mobile Station Equipment Identity (IMEI) number, operating system (OS) version, plug-in version, and the like.

The present disclosure describes a method and system for a centralized merchant loyalty platform. The centralized merchant loyalty platform allows merchants to establish consumer loyalty programs without requiring a merchant to invest in additional computing resources to manage and track consumer rewards.

Merchant loyalty reward programs can be very beneficial to incentivize consumer retention and increase the total sale from existing consumer. However, these loyalty reward programs are only effective when there is active consumer participation. Prior consumer loyalty programs required the consumer to present a loyalty card or a loyalty program identifier during the purchase in order for the transaction to count towards the consumer's rewards. These programs slow down transaction times by requiring additional steps and can impede consumer adoption of these programs. Additionally, the merchant is responsible for initial technology investment to implement a system that tracks and updates a consumer account based on spending, and applies a benefit when the consumer ultimately applies a rewards benefit. The merchant is also responsible for the cost of marketing the loyalty program to their consumers and conveying the benefits of joining the loyalty program. This may require the merchant to invest in costly marketing campaigns in order to attract and maintain consumer participation.

Accordingly, the present disclosure provides a centralized merchant loyalty platform that reduces the individual merchant cost by creating a scalable platform that can distribute the required computing resource among a plurality of merchants. The centralized merchant loyalty platform creates a scalable platform for interoperability among a plurality of different merchants. The platform reduces the initial upfront technology and market costs of establishing a loyalty program on an individual merchant. The merchant can use their existing computing resources without the need to overhaul their existing systems.

The centralized merchant loyalty platform provides a seamless integration into existing issuer systems that provides a frictionless consumer experience and encourages consumer adoption. The merchant loyalty programs may be automatically integrated into the consumer's existing account with their issuer system and would not require the consumer to create a new loyalty program account for each specific merchant. They may conveniently view and manage each loyalty program through a single existing application with their issuer.

FIG. 1 shows a network architecture diagram for a centralized merchant loyalty platform 100, according to at least one aspect of the present disclosure. The centralized merchant loyalty platform 100 comprises a merchant device 102, loyalty platform 104, payment processing server 106, issuer system 108, and user device 110, communicably coupled through a communication network 112 (e.g., wide area network). The centralized loyalty platform 100 is shown with a merchant device 102 but may comprise a plurality of merchant devices for different participating merchants. In various aspects, the loyalty platform 104 and the payment processing server 106 may be combined into a single server. Additionally, the loyalty platform 104 may comprise a storage system for maintaining consumer point loyalty for a plurality of merchants in a loyalty points database. In one example, the loyalty points may be calculated as points, miles, or a cash value that can be applied to a purchase amount.

FIG. 2 shows a network architecture diagram for a centralized merchant loyalty platform 200, where the payment processing server 106 and the loyalty rewards server 104 are part of the payment network 220, according to at least one aspect of the present disclosure. The issuer systems that utilize the payment network 220 may automatically have access to the participating merchant loyalty programs managed by the loyalty rewards server 104. This automatic integration can substantially increase the number of participating consumers.

In one example, a consumer has a payment account with the issuer system 108 and the issuer application on their user device 110. The user device 110 may receive a notification through the issuer application for a merchant loyalty program when they make a first purchase with a participating merchant 102. The consumer may perform a one-time activation, through the issuer application, to begin participating in the merchant loyalty program. In another example, the consumer may automatically be enrolled in the loyalty program and not need to perform the one-time activation.

FIG. 3 shows an exemplary application interface displaying merchant loyalty points 300 in an issuer application 302, according to at least one aspect of the present disclosure. The issuer application 302 aggregates all participating merchant loyalty programs into a single convenient interface that allows the consumer to view, configure, and redeem rewards for all participating merchants. In one view of the issuer application 302, the participating merchant 304a-c are displayed with their corresponding point totals 306a-c. In one example, the consumer may select one of the participating merchants 304a-c, by pressing or clicking on the merchant in the issuer application 302, to view more merchant specific program information (FIG. 4). The merchant specific program information may include a current point total, previously redeemed points, previously redeemed rewards, existing merchant rewards rules, and consumer configurable settings for automatic point redemption.

FIG. 4 shows an exemplary application interface displaying merchant specific information 400 in an issuer application 302, according to at least one aspect of the present disclosure. The consumer may navigate to view merchant specific information by selecting any one of the merchants 304a-c, as shown in FIG. 3. The merchant specific information 400 comprises a plurality of settings for the merchant (e.g., Merchant A) including a first section 402 to create a new automatic redemption rule, a second selection 404 to view the existing automatic redemption rules set by the consumer, a third selection 406 to edit existing automatic redemption rules set by the consumer, and a fourth selection 408 to view the earned-rewards rules set by the merchant. In one example, a consumer may create an automatic loyalty points redemption rule that applies the earned points when the redemption value is greater than or equal to $50.00. In another example, the consumer may set a redemption rule that applies loyalty points when the redemption value is greater than or equal to $50.00 and the original transaction amount is greater than or equal to $50.00.

FIG. 5 shows a logic flow diagram 500 for earning loyalty points for a merchant 102 on a centralized merchant loyalty platform, according to at least one aspect of the present disclosure. The consumer makes 502 a first purchase with a payment device associated with the issuer system 108. The merchant device 102 transmits 504 a transaction authorization request to the payment processing server 106 associated with the issuer system 108 of the consumer payment device. The transaction authorization request comprises transaction information including the transaction amount, the merchant information, and the payment device information associated with the consumer account. The payment processing server 106 routes 506 the authorization request to the issuer system 108. The issuer system 108 approves or denies the authorization request for the transaction and transmits 508 an authorization response to the payment processing server 106. The payment processing server 106 forwards 510 the authorization response to the merchant device 102. The merchant device 102 displays 512 the results of the authorization response and completes the transaction for approved transactions.

The payment processing server 106 determines, based on the authorization response from the issuer system 108, that the authorization request for the transaction was approved by the issuer system 108. The payment processing server 106 may also determine that the merchant 102 is a participating merchant with the loyalty platform and the consumer activated the rewards program with the merchant. The payment processing server 106 transmits 514 the transaction information, that was received as part of the authorization request, to the loyalty platform 104. The loyalty platform 104 parses the transaction information to determine the consumer PAN, the merchant identifier, and transaction amount. The loyalty platform 104 calculates an earned loyalty point value based on the transaction amount and merchant rules for the merchant. The merchant calculation rules may apply a flat calculation for all transactions (e.g., 2 points per dollar spent, 0.5% of transaction amount) or may use more complicated rules that require purchase item information. In one example, a merchant 102 may run weekly specials where certain items are worth more points per dollar. After the loyalty platform 104 calculates the point total, the consumer account information is accessed in the consumer loyalty points database and updated with the calculated point total. The loyalty platform 104 transmits 518 loyalty points earned notification to the issuer system based on the primary account number of the consumer. The issuer system 108 transmits a push notification to the issuer application 302 on the user device 110.

FIG. 6 shows a logic flow diagram 600 for configuring redemption rules by a consumer on a centralized merchant loyalty platform, according to at least one aspect of the present disclosure. In various aspect, the user device 110 comprises an issuer application 302 that allows the consumer to view 630 loyalty programs associated with each of the participating merchants. The user device 110 sends 602 a request to the issuer system 108 by selecting the merchant loyalty points option in the issuer application 302. The issuer system 108 receives the request and retrieves 604 the consumer PAN. The issuer system 108 forwards 606 the requests with the consumer PAN to the loyal platform 104. The loyalty platform 104 queries 608 the consumer loyalty points for one or all merchants based on the consumer PAN received from the issuer system 108. The loyalty platform 104 returns 610 the merchant loyalty points to the issuer system. The issuer system 108 provides 612 the merchant loyalty points to the user device through the issuer application 302 (see FIG. 3).

After the consumer views a main menu of merchants, the issuer application 302 allows the consumer to view and configure 640 a loyalty point redemption program associated with each of the merchants 304a-c. The consumer selects a button 402 in the issuer application 302 to create 614 a new automatic redemption rule for a merchant. The issuer system 108 receives the request to create a new redemption rule with the merchant information and rule information. The issuer system provides 616 the loyalty platform 104 with the consumer PAN, the merchant information, and the new rule. The loyalty platform 104 creates 617 a new redemption rule for the merchant loyalty program for the consumer and provides 618 the issuer system 108 with an acknowledgement or confirmation message for the rule status. The rule status may indicate that the rule has been added, enabled, disabled, updated, or removed. The issuer system 108 provides 620 the rule status to the user device through the issuer application 302 (see FIG. 4). Additionally, the consumer may select a button in the issuer application 302 to modify 406 or reconfigure an existing redemption rule, view 404 the existing consumer redemption rules, or view 408 merchant earned-rewards rules.

FIG. 7 shows a logic flow diagram 700 for redeeming loyalty points 730 in a centralized merchant loyalty platform, according to at least one aspect of the present disclosure. The consumer initiates 702 a transaction with a payment device through the merchant system 102. The merchant system receives the consumer PAN from the consumer payment device and provides 704 a transaction authorization request to the payment processing server 106. The transaction authorization request comprises the consumer PAN, the transaction information (e.g., transaction amount, itemized list of goods, timestamp of request, etc.), and the merchant information or merchant identifier. The payment processing server 106 sends 706 a loyalty redemption check request to the loyalty platform 104 to determine whether the transaction meets the criteria for an automatic redemption rule and forwards the consumer PAN, merchant identifier, and the transaction information to the loyalty platform 104. The loyalty platform 104 determines 708 that the transaction meets the criteria for the redemption of loyalty points according to a merchant earned-rewards rule and/or a consumer redemption rule. In one examples, the redemption rule sets a minimum transaction amount and a minimum number of redemption points needed to apply the loyalty points to a transaction. The loyalty platform 104 transmits 710 a redemption message to the payment processing server 106. The redemption message comprises the number of redeemed points (e.g., 0 points to n points, where n points covers the full transaction amount). The payment processing server 106 calculates the remaining authorization amount after the redemption of the loyalty points. In one example, the consumer rewards were not redeemed so 0 points were redeemed and the full transaction amount is remaining. In another example, the consumer's loyalty points were redeemed to cover a partial portion of the transaction amount. The payment processing server 106 calculates 712 the remaining transaction amount based on the original transaction amount and the number of redeemed points. The payment processing server 106 provides 714 the remaining transaction amount and the transaction information to the issuer system 108 in an updated authorization request. The issuer system 108 authorizes an updated authorization request and provides 716 an authorization response to the payment processing server 106. The payment processing server 106 forwards 718 the authorization response to the merchant device 102. The payment processing server 106 also forwards 719 the authorization response to the loyalty platform 102 to update the consumer loyalty points. The authorization response comprises information about the amount funded through loyalty point redemption and amount authorized by issuer system 108. The merchant device 102 displays 720 the results of the authorization response and completes the transaction for approved transactions. The payment server 106 sends 719 the transaction status, received from issuer system 108, to the loyalty platform 104. The loyalty platform 104 confirms 722 that entry in the database of the consumer loyalty points reflects the redeemed amount.

Once the transaction is completed, the payment processing server 106 performs 740 a settlement for the full transaction amount or the partial transaction amount. The issuer system 108 provides 724 the payment processing server 106 with a settlement amount for the full or partial authorization amount based on the updated authorization request. The payment processing server 106 forwards 726 the settlement amount (due from the issuer system 108) to the merchant system 102 through the merchant's acquiring bank.

FIG. 8 is a block diagram of a computer apparatus 800 with data processing subsystems or components, according to at least one aspect of the present disclosure. Each of the plurality of systems and servers shown in FIGS. 1 and 2 may configured according to the computer apparatus 800. The subsystems shown in FIG. 8 are interconnected via a system bus 810. Additional subsystems such as a printer 818, keyboard 826, fixed disk 828 (or other memory comprising computer-readable media), monitor 822, which is coupled to a display adapter 820, and others are shown. Peripherals and input/output (I/O) devices, which couple to an I/O controller 812 (which can be a processor or other suitable controller), can be connected to the computer system by any number of means known in the art, such as a serial port 824. For example, the serial port 824 or external interface 830 can be used to connect the computer apparatus to a wide area network such as the Internet, a mouse input device, or a scanner. The interconnection via system bus allows the central processor 816 to communicate with each subsystem and to control the execution of instructions from system memory 814 or the fixed disk 828, as well as the exchange of information between subsystems. The system memory 814 and/or the fixed disk 828 may embody a computer-readable medium.

FIG. 9 is a diagrammatic representation of an example system 900 that includes a host machine 902 within which a set of instructions to perform any one or more of the methodologies discussed herein may be executed, according to at least one aspect of the present disclosure. In various aspects, the host machine 902 operates as a standalone device or may be connected (e.g., networked) to other machines. In a networked deployment, the host machine 902 may operate in the capacity of a server or a client machine in a server-client network environment, or as a peer machine in a peer-to-peer (or distributed) network environment. The host machine 902 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 900 includes the host machine 902, running a host operating system (OS) 904 on a processor or multiple processor(s)/processor core(s) 906 (e.g., a central processing unit (CPU), a graphics processing unit (GPU), or both), and various memory nodes 908. The host OS 904 may include a hypervisor 910 which is able to control the functions and/or communicate with a virtual machine ("VM") 912 running on machine readable media. The VM 912 also may include a virtual CPU or vCPU 914. The memory nodes 908 may be linked or pinned to virtual memory nodes or vNodes 916. When the memory node 908 is linked or pinned to a corresponding vNode 916, then data may be mapped directly from the memory nodes 908 to their corresponding vNodes 916.

All the various components shown in host machine 902 may be connected with and to each other, or communicate to each other via a bus (not shown) or via other coupling or communication channels or mechanisms. The host machine 902 may further include a video display, audio device or other peripherals 918 (e.g., a liquid crystal display (LCD), alphanumeric input device(s) including, e.g., a keyboard, a cursor control device, e.g., a mouse, a voice recognition or biometric verification unit, an external drive, a signal generation device, e.g., a speaker,) a persistent storage device 920 (also referred to as disk drive unit), and a network interface device 922. The host machine 902 may further include a data encryption module (not shown) to encrypt data. The components provided in the host machine 902 are those typically found in computer systems that may be suitable for use with aspects of the present disclosure and are intended to represent a broad category of such computer components that are known in the art. Thus, the system 900 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 924 also may be a Solid-state Drive (SSD), a hard disk drive (HDD) or other includes a computer or machine-readable medium on which is stored one or more sets of instructions and data structures (e.g., data/instructions 926) embodying or utilizing any one or more of the methodologies or functions described herein. The data/instructions 926 also may reside, completely or at least partially, within the main memory node 908 and/or within the processor(s) 906 during execution thereof by the host machine 902. The data/instructions 926 may further be transmitted or received over a network 928 via the network interface device 922 utilizing any one of several well-known transfer protocols (e.g., Hyper Text Transfer Protocol (HTTP)).

The processor(s) 906 and memory nodes 908 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 902 and that causes the host machine 902 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 930 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 902, with each server 930 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

Clause 1. A computer-implemented method, comprising: receiving, by a processing server, a transaction authorization request, wherein the transaction authorization request comprises transaction information associated with a transaction between a customer and a merchant, and wherein the transaction information comprises an original transaction amount, a merchant identifier associated with the merchant, and a consumer PAN (primary account number) associated with a consumer; querying, by the processing server, earned-rewards rules, set by the merchant with the merchant identifier, and redemption rules, set by the consumer with the consumer PAN; determining, by the processing server, the transaction qualifies to earn rewards based on the original transaction amount and the earned-rewards rules; calculating, by the processing server, a value associated with redeemed points to apply to the transaction based on the earned-rewards rules and the redemption rules; updating, by the processing server, an updated transaction amount for the transaction authorization request, wherein the updated transaction amount is the original transaction amount in the transaction authorization request is reduced by the value associated with the redeemed points; transmitting, by the processing server, the updated transaction amount for the transaction authorization request to an issuer system; receiving, by the processing server, an authorization response indicating that the updated transaction amount was approved for the transaction authorization request; updating, by the processing server, a loyalty points balance in a loyalty points database for the consumer based on the consumer PAN and the merchant identifier; and transmitting, by the processing server, the authorization response to the merchant indicating that the updated transaction amount was approved for the transaction authorization request.

Clause 2. The computer-implemented method of claim 1, wherein the original transaction amount is greater than the value associated with the redeemed points.

Clause 3. The computer-implemented method of any of Clauses 1-2, further comprising: updating, by the processing server, authorization response to include the original transaction amount, the updated transaction amount, and the value associated with the redeemed points.

Clause 4. The computer-implemented method of claim 2, further comprising: receiving, by the processing server, a settlement response from the issuer system, wherein the settlement response comprises a settlement amount for a partial amount of the original transaction amount.

Clause 5. The computer-implemented method of any of Clauses 1-4, further comprising: calculating, by the processing server, a new rewards value based on the original transaction amount, the redeemed points, and the earned-rewards rules; and updating, by the processing server, the loyalty points balance in the loyalty points database for the consumer based on the consumer PAN, the merchant identifier, and the new rewards value.

Clause 6. The computer-implemented method of any of Clauses 1-5, further comprising: receiving, by the processing server, a request to view the loyalty points balance for each of a plurality of merchants associated with the consumer PAN, wherein the request comprises the consumer PAN and merchant IDs for each of the plurality of merchants; and transmitting, by the processing server, the loyalty points balance for each of the plurality of merchants associated with the consumer PAN to the issuer system, wherein issuer system provides the loyalty points balance for each of the plurality of merchants to the consumer through an issuer application.

Clause 7. The computer-implemented method of any of Clauses 1-6, further comprising: receiving, by the processing server, a new rule request to add a new consumer redemption rule, wherein the new rule request comprises a consumer PAN, a second merchant ID associated with a second merchant, and the new consumer redemption rule; and providing, by the processing server, an acknowledgement message to the issuer system to indicate that the new consumer redemption rule was added to the loyalty points database for the consumer.

Clause 8. The computer-implemented method of any of Clauses 1-7, further comprising: receiving, by the processing server, a configuration request to configure an existing consumer redemption rule, wherein the configuration request comprises a consumer PAN, a second merchant ID associated with a second merchant, and a modification to the existing consumer redemption rule; and providing, by the processing server, an acknowledgement message to the issuer system to indicate that the modification to the existing consumer redemption rule was added to the loyalty points database for the consumer.

Clause 9. A computer-implemented method, comprising: receiving, by a loyalty rewards server, transaction information associated with a transaction between a customer and a merchant, wherein the transaction information comprises a transaction amount, a merchant identifier associated with the merchant, and a consumer PAN associated with a consumer; querying, by the loyalty rewards sever, earned-rewards rules, set by the merchant, with the merchant identifier and redemption rules, set by the consumer, with the consumer PAN; determining, by the loyalty rewards server, the transaction qualifies to apply customer rewards to the transaction amount based the earned-rewards rules; calculating, by the loyalty rewards server, a value associated with redeemed points to apply to the transaction based on the earned-rewards rules and the redemption rules; transmitting, by the loyalty rewards server, the value associated with the redeemed points to a payment processing server, wherein the transaction amount in a transaction authorization request is reduced by the value associated with the redeemed points; receiving, by the loyalty rewards server, a message indicating that the transaction amount was approved for the transaction authorization request; and updating, by the loyalty rewards server, a loyalty points balance in a loyalty points database for the consumer based on the consumer PAN and the merchant identifier.

Clause 10. The computer-implemented method of Clause 9, further comprising: calculating, by the loyalty rewards server, a new rewards value based on the transaction amount and the earned-rewards rules; and updating, by the loyalty rewards server, the loyalty points balance in the loyalty points database for the consumer based on the consumer PAN, the merchant identifier, and the new rewards value.

Clause 11. The computer-implemented method of any of Clauses 9-10, further comprising: receiving, by the loyalty rewards server, a request to view the loyalty points balance for each of a plurality of merchants associated with the consumer PAN, wherein the request comprises the consumer PAN and merchant IDs for each of the plurality of merchants; and transmitting, by the loyalty rewards server, the loyalty points balance for each of the plurality of merchants associated with the consumer PAN to an issuer system, wherein issuer system provides the loyalty points balance for each of the plurality of merchants to the consumer through an issuer application.

Clause 12. The computer-implemented method of any of Clauses 9-11, further comprising: receiving, by the loyalty rewards server, a new rule request to add a new consumer redemption rule, wherein the new rule request comprises a consumer PAN, a second merchant ID associated with a second merchant, and the new consumer redemption rule; and providing, by the loyalty rewards server, an acknowledgement message to an issuer system to indicate that the new consumer redemption rule was added to the loyalty points database for the consumer.

Clause 13. The computer-implemented method of any of Clauses 9-12, further comprising: receiving, by the loyalty rewards server, a configuration request to configure an existing consumer redemption rule, wherein the configuration request comprises a consumer PAN, a second merchant ID associated with a second merchant, and a modification to the existing consumer redemption rule; and providing, by the loyalty rewards server, an acknowledgement message to an issuer system to indicate that the modification to the existing consumer redemption rule was added to the loyalty points database for the consumer.

Clause 14. A system comprising: a memory; and one or more processors communicably coupled to the memory, wherein the one or more processors is configured to: receive a transaction authorization request, wherein the transaction authorization request comprises transaction information associated with a transaction between a customer and a merchant, and wherein the transaction information comprises an original transaction amount, a merchant identifier associated with the merchant, and a consumer PAN associated with a consumer; query earned-rewards rules, set by the merchant, with the merchant identifier and redemption rules, set by the consumer, with the consumer PAN; determine the transaction qualifies to apply customer rewards to the original transaction amount based the earned-rewards rules and the redemption rules; calculate a value associated with redeemed points to apply to the transaction based on the earned-rewards rules and the redemption rules; update an updated transaction amount for the transaction authorization request, wherein the updated transaction amount is the original transaction amount in the transaction authorization request is reduced by the value associated with the redeemed points; transmit the updated transaction amount for the transaction authorization request to an issuer system; receive an authorization response indicating that the updated transaction amount was approved for the transaction authorization request; update a loyalty points balance in a loyalty points database for the consumer based on the consumer PAN and the merchant identifier; and transmit the authorization response to the merchant indicating that the updated transaction amount was approved for the transaction authorization request.

Clause 15. The system of Clause 14, wherein the original transaction amount is greater than the value associated with the redeemed points.

Clause 16. The system of any of Clauses 14-15, further comprising: update authorization response to include the original transaction amount, the updated transaction amount, and the value associated with the redeemed points.

Clause 17. The system of Clause 15, further comprising: receive a settlement response from the issuer system, wherein the settlement response comprises a settlement amount for a partial amount of the original transaction amount.

Clause 18. The system of any of Clauses 14-17, further comprising: calculate a new rewards value based on the original transaction amount, the redeemed points, and the earned-rewards rules; and update the loyalty points balance in the loyalty points database for the consumer based on the consumer PAN, the merchant identifier, and the new rewards value.

Clause 19. The system of any of Clauses 14-18, further comprising: receive a request to view the loyalty points balance for each of a plurality of merchants associated with the consumer PAN, wherein the request comprises the consumer PAN and merchant IDs for each of the plurality of merchants; and transmit the loyalty points balance for each of the plurality of merchants associated with the consumer PAN to the issuer system, wherein issuer system provides the loyalty points balance for each of the plurality of merchants to the consumer through an issuer application.

Clause 20. The system of any of Clauses 14-19, further comprising: receive a new rule request to add a new consumer redemption rule, wherein the new rule request comprises a consumer PAN, a second merchant ID associated with a second merchant, and the new consumer redemption rule; and provide an acknowledgement message to the issuer system to indicate that the new consumer redemption rule was added to the loyalty points database for the consumer.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer-readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer-readable medium, such as RAM, ROM, a magnetic medium such as a hard-drive or a floppy disk, or an optical medium such as a CD-ROM. Any such computer-readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer-readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A computer-implemented method, comprising:
    displaying, by a consumer device via execution of an issuer application operating on the consumer device, a graphical user interface (GUI) comprising a button configured to allow modification of a first redemption rule associated with a merchant, wherein the issuer application is associated with an issuer system and enables a consumer to view loyalty program data for a plurality of merchants associated with the consumer;
    transmitting, by the consumer device and at least in part in response to selection of the button by the consumer, a requested modification to the first redemption rule;
    receiving, by a processing server and at least in part in response to the requested modification to the first redemption rule, a configuration request to configure the first redemption rule, wherein the configuration request comprises a consumer PAN (primary account number), a merchant identifier associated with the merchant, and the requested modification to the first redemption rule, wherein the first redemption rule is a preexisting rule stored on a rewards database;
    modifying, by the processing server, the first redemption rule associated with the merchant at the rewards database for the consumer, wherein the rewards database comprises rewards data for the plurality of merchants associated with the consumer, and wherein the rewards database is remote to the plurality of merchants;
    providing, by the processing server, an acknowledgement message to the issuer system indicating that the first redemption rule was modified;
    receiving, by the processing server, a transaction authorization request, wherein the transaction authorization request comprises transaction information associated with a transaction between the consumer and the merchant, and wherein the transaction information comprises an original transaction amount, the merchant identifier associated with the merchant, and the consumer PAN associated with the consumer;

querying the rewards database, by the processing server, for earned-rewards rules, set by the merchant with the merchant identifier, and redemption rules, set by the consumer with the consumer PAN, wherein the redemption rules automatically apply an earned-rewards, and wherein the redemption rules comprise the modified first redemption rule;

determining, by the processing server, the transaction qualifies to earn rewards based on the original transaction amount and the earned-rewards rules;

calculating, by the processing server, a value associated with redeemed points to apply to the transaction based on the earned-rewards rules and the modified first redemption rule;

updating, by the processing server, an updated transaction amount for the transaction authorization request, wherein the updated transaction amount is the original transaction amount in the transaction authorization request reduced by the value associated with the redeemed points;

transmitting, by the processing server, the updated transaction amount for the transaction authorization request to the issuer system;

receiving, by the processing server, an authorization response indicating that the updated transaction amount was approved for the transaction authorization request;

updating, by the processing server, a rewards balance in the rewards database for the consumer based on the consumer PAN and the merchant identifier; and transmitting, by the processing server, the authorization response to the merchant indicating that the updated transaction amount was approved for the transaction authorization request.

2. The computer-implemented method of claim 1, wherein the original transaction amount is greater than the value associated with the redeemed points.

3. The computer-implemented method of claim 1, further comprising:
updating, by the processing server, the authorization response to include the original transaction amount, the updated transaction amount, and the value associated with the redeemed points.

4. The computer-implemented method of claim 2, further comprising:
receiving, by the processing server, a settlement response from the issuer system, wherein the settlement response comprises a settlement amount for a partial amount of the original transaction amount.

5. The computer-implemented method of claim 1, further comprising:
calculating, by the processing server, a new rewards value based on the original transaction amount, the redeemed points, and the earned-rewards rules; and
updating, by the processing server, the rewards balance in the rewards database for the consumer based on the consumer PAN, the merchant identifier, and the new rewards value.

6. The computer-implemented method of claim 1, further comprising:
receiving, by the processing server, a request to view the rewards balance for each of the plurality of merchants associated with the consumer, wherein the request comprises the consumer PAN and merchant identifiers for each of the plurality of merchants;

querying, by the processing server, the rewards database for the rewards balance for each of the plurality of merchants associated with the consumer; and transmitting, by the processing server, the rewards balance for each of the plurality of merchants associated with the consumer to the issuer system, wherein the issuer system provides the rewards balance for each of the plurality of merchants to the consumer through the issuer application.

7. The computer-implemented method of claim 1, further comprising:
receiving, by the processing server, a new rule request to add a new consumer redemption rule, wherein the new rule request comprises the consumer PAN, a second merchant identifier associated with a second merchant, and the new consumer redemption rule;
adding the new consumer redemption rule to the rewards database, wherein the new consumer redemption rule is searchable by the consumer PAN, the second merchant identifier, or both; and
providing, by the processing server, a new rule acknowledgement message to the issuer system indicating that the new consumer redemption rule was added to the rewards database for the consumer.

8. A computer-implemented method, comprising:
displaying, by a consumer device via execution of an issuer application operating on the consumer device, a graphical user interface (GUI) comprising a button configured to allow modification of a first redemption rule associated with a merchant, wherein the issuer application is associated with an issuer system and enables a consumer to view loyalty program data for a plurality of merchants associated with the consumer;
transmitting, by the consumer device and at least in part in response to selection of the button by the consumer, a requested modification to the first redemption rule;
receiving, by a loyalty rewards server and at least in part in response to the requested modification to the first redemption rule, a configuration request to configure the first redemption rule, wherein the configuration request comprises a consumer PAN, a merchant identifier associated with the merchant, and the requested modification to the first redemption rule;
modifying, by the loyalty rewards server, the first redemption rule associated with the merchant at a rewards database for the consumer, wherein the rewards database comprises rewards data for the plurality of merchants associated with a consumer, and wherein the rewards database is remote to the plurality of merchants;
providing, by the loyalty rewards server, an acknowledgement message to the issuer system indicating that the first redemption rule was modified;
receiving, by the loyalty rewards server, transaction information associated with a transaction between the consumer and the merchant, wherein the transaction information comprises a transaction amount, the merchant identifier associated with the merchant, and the consumer PAN associated with the consumer;
querying the rewards database, by the loyalty rewards server, earned-rewards rules, set by the merchant, with the merchant identifier and redemption rules set by the consumer, wherein the redemption rules automatically apply an earned-rewards, and wherein the redemption rules comprise the modified first redemption rule;

determining, by the loyalty rewards server, the transaction qualifies to apply consumer rewards to the transaction amount based the earned-rewards rules;

calculating, by the loyalty rewards server, a value associated with redeemed points to apply to the transaction based on the earned-rewards rules and the modified first redemption rule;

transmitting, by the loyalty rewards server, the value associated with the redeemed points to a payment processing server, wherein the transaction amount in a transaction authorization request is reduced by the value associated with the redeemed points;

receiving, by the loyalty rewards server, a message indicating that the transaction amount was approved for the transaction authorization request; and updating, by the loyalty rewards server, a rewards balance in the rewards database for the consumer based on the consumer PAN and the merchant identifier.

9. The computer-implemented method of claim 8, further comprising:

calculating, by the loyalty rewards server, a new rewards value based on the transaction amount and the earned-rewards rules; and updating, by the loyalty rewards server, the rewards balance in the rewards database for the consumer based on the consumer PAN, the merchant identifier, and the new rewards value.

10. The computer-implemented method of claim 8, further comprising:

receiving, by the loyalty rewards server, a request to view the rewards balance for each of the plurality of merchants associated with the consumer, wherein the request comprises the consumer PAN and merchant identifiers for each of the plurality of merchants;

querying, by the loyalty rewards server, the rewards database for the rewards balance for each of the plurality of merchants associated with the consumer; and transmitting, by the loyalty rewards server, the rewards balance for each of the plurality of merchants associated with the consumer to the issuer system, wherein the issuer system provides the rewards balance for each of the plurality of merchants to the consumer through the issuer application.

11. The computer-implemented method of claim 8, further comprising:

receiving, by the loyalty rewards server, a new rule request to add a new consumer redemption rule, wherein the new rule request comprises the consumer PAN, a second merchant identifier associated with a second merchant, and the new consumer redemption rule;

adding the new consumer redemption rule to the rewards database, wherein the new consumer redemption rule is searchable by the consumer PAN, the second merchant identifier, or both; and providing, by the loyalty rewards server, a new rule acknowledgement message to the issuer system to indicate that the new consumer redemption rule was added to the rewards database for the consumer.

12. A system comprising:

one or more memories; and one or more processors communicably coupled to the memories, wherein the one or more processors is configured to:

display, via execution of an issuer application, a graphical user interface (GUI) on a consumer device comprising a button configured to allow modification of a first redemption rule associated with a merchant, wherein the issuer application is associated with an issuer system and enables a consumer to view loyalty program data for a plurality of merchants associated with the consumer;

transmitting, at least in part in response to selection of the button by the consumer, a requested modification to the first redemption rule;

receive, and at least in part in response to the requested modification to the first redemption rule, a configuration request to configure the first redemption rule, wherein the configuration request comprises a consumer PAN, a merchant identifier associated with merchant, and the requested modification to the first redemption rule;

modifying the first redemption rule associated with the merchant at a rewards database for the consumer, wherein the rewards database comprises rewards data for the plurality of merchants associated with the consumer, and wherein the rewards database is remote to the plurality of merchants;

providing an acknowledgement message to the issuer system indicating that the first redemption rule was modified;

receive a transaction authorization request, wherein the transaction authorization request comprises transaction information associated with a transaction between the consumer and the merchant, and wherein the transaction information comprises an original transaction amount, the merchant identifier associated with the merchant, and the consumer PAN associated with the consumer;

query the rewards database for earned-rewards rules, set by the merchant, with the merchant identifier and redemption rules, set by the consumer, with the consumer PAN, wherein the redemption rules automatically apply an earned-rewards, and wherein the redemption rules comprise the modified first redemption rule;

determine the transaction qualifies to apply consumer rewards to the original transaction amount based the earned-rewards rules and the modified first redemption rule;

calculate a value associated with redeemed points to apply to the transaction based on the earned-rewards rules and the modified first redemption rule;

update an updated transaction amount for the transaction authorization request, wherein the updated transaction amount is the original transaction amount in the transaction authorization request reduced by the value associated with the redeemed points;

transmit the updated transaction amount for the transaction authorization request to the issuer system;

receive an authorization response indicating that the updated transaction amount was approved for the transaction authorization request;

update a rewards balance in the rewards database for the consumer based on the consumer PAN and the merchant identifier; and transmit the authorization response to the merchant indicating that the updated transaction amount was approved for the transaction authorization request.

13. The system of claim 12, wherein the original transaction amount is greater than the value associated with the redeemed points.

14. The system of claim 12, wherein the one or more processors is further configured to:

update the authorization response to include the original transaction amount, the updated transaction amount, and the value associated with the redeemed points.

15. The system of claim 13, wherein the one or more processors is further configured to:
receive a settlement response from the issuer system, wherein the settlement response comprises a settlement amount for a partial amount of the original transaction amount.

16. The system of claim 12, wherein the one or more processors is further configured to:
calculate a new rewards value based on the original transaction amount, the redeemed points, and the earned-rewards rules; and
update the rewards balance in the rewards database for the consumer based on the consumer PAN, the merchant identifier, and the new rewards value.

17. The system of claim 12, wherein the one or more processors is further configured to:
receive a request to view the rewards balance for each of the plurality of merchants associated with the consumer, wherein the request comprises the consumer PAN and merchant identifiers for each of the plurality of merchants;
querying the rewards database for the rewards balance for each of the plurality of merchants associated with the consumer; and
transmit the rewards balance for each of the plurality of merchants associated with the consumer to the issuer system, wherein the issuer system provides the rewards balance for each of the plurality of merchants to the consumer through the an issuer application.

18. The system of claim 12, wherein the one or more processors is further configured to:
receive a new rule request to add a new consumer redemption rule, wherein the new rule request comprises the consumer PAN, a second merchant identifier associated with a second merchant, and the new consumer redemption rule;
adding the new consumer redemption rule to the rewards database, wherein the new consumer redemption rule is searchable by the consumer PAN, the second merchant identifier, or both; and
provide a new rule acknowledgement message to the issuer system to indicate that the new consumer redemption rule was added to the rewards database for the consumer.

* * * * *